(12) United States Patent
Harary et al.

(10) Patent No.: US 10,229,347 B2
(45) Date of Patent: Mar. 12, 2019

(54) SYSTEMS AND METHODS FOR IDENTIFYING A TARGET OBJECT IN AN IMAGE

(71) Applicant: International Business Machines Corporation, Armonk, NY (US)

(72) Inventors: Sivan Harary, Manof (IL); Leonid Karlinsky, Mazkeret Batya (IL); Mattias Marder, Haifa (IL); Joseph Shtok, Haifa (IL); Asaf Tzadok, Nesher (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/594,611

(22) Filed: May 14, 2017

(65) Prior Publication Data

US 2018/0330198 A1    Nov. 15, 2018

(51) Int. Cl.
G06K 9/62    (2006.01)
G06K 9/46    (2006.01)
(Continued)

(52) U.S. Cl.
CPC ....... *G06K 9/6267* (2013.01); *G06F 17/3028* (2013.01); *G06F 17/30256* (2013.01);
(Continued)

(58) Field of Classification Search
None
See application file for complete search history.

(56) References Cited

U.S. PATENT DOCUMENTS 7,412,429 B1 * 8/2008 Syeda-Mahmood ....................... G06K 9/6226 706/45
8,189,855 B2  5/2012 Opalach et al.
(Continued)

FOREIGN PATENT DOCUMENTS

WO    2012146253    11/2012

OTHER PUBLICATIONS

Szegedy et al. ("Deep Neural Networks for Object Detection," Advances in Neural Information Processing Systems 26 (NIPS 2013).*

(Continued)

*Primary Examiner* — Soo Shin
(74) *Attorney, Agent, or Firm* — G. E Eherlich

(57) ABSTRACT

There is provided a method of identifying objects in an image, comprising: extracting query descriptors from the image, comparing each query descriptor with training descriptors for identifying matching training descriptors, each training descriptor is associated with a reference object identifier and with relative location data (distance and direction from a center point of a reference object indicated by the reference object identifier), computing object-regions of the digital image by clustering the query descriptors having common center points defined by the matching training descriptors, each object-region approximately bounding one target object and associated with a center point and a scale relative to a reference object size, wherein the object-regions are computed independently of the identifier of the reference object associated with the object-regions, wherein members of each cluster point toward a common center point, and classifying the target object of each object-region according to the reference object identifier of the cluster.

18 Claims, 5 Drawing Sheets

(51) Int. Cl.
*G06N 5/04* (2006.01)
*G06N 99/00* (2010.01)
*G06F 17/30* (2006.01)

(52) U.S. Cl.
CPC ..... *G06F 17/30268* (2013.01); *G06K 9/4604* (2013.01); *G06N 5/04* (2013.01); *G06N 99/005* (2013.01)

(56) References Cited

U.S. PATENT DOCUMENTS

| 8,837,839 B1 | 9/2014 | Huber et al. | |
| 2007/0179921 A1* | 8/2007 | Zitnick | G06K 9/6211 706/20 |
| 2013/0288702 A1* | 10/2013 | Abu-Alqumsan | G06F 17/30247 455/456.1 |
| 2015/0049943 A1* | 2/2015 | Hamsici | G06K 9/4609 382/170 |
| 2015/0170002 A1 | 6/2015 | Szegedy et al. | |
| 2016/0078057 A1* | 3/2016 | Perez de la Coba | G06F 17/30256 707/772 |
| 2017/0154244 A1* | 6/2017 | Brendel | G06K 9/6212 |

OTHER PUBLICATIONS

Szegedy et al., "Deep Neural Networks for Object Detection", Advances in Neural Information Processing Systems 26, 2013, pp. 2553-2561.

Erhan et al., "Scalable Object Detection using Deep Neural Networks", IEEE Conference on Computer Vision and Pattern Recognition, 2014, pp. 2147-2154.

El Daher et al., "Object Recognition and Classification from 3D Point Clouds", CS 229 Machine Learning Final Projects, Autumn 2006 (Stanford University).

Wohlhart et al., "Learning Descriptors for Object Recognition and 3D Pose Estimation", IEEE Conference on Computer Vision and Pattern Recognition (CVPR), 2015.

* cited by examiner

SYSTEMS AND METHODS FOR IDENTIFYING A TARGET OBJECT IN AN IMAGE

BACKGROUND

The present invention, in some embodiments thereof, relates to image processing and, more specifically, but not exclusively, to systems and methods for identifying objects in images.

Different methods have been developed to attempt to identify and classify objects in an image. For example, deep learning methods are trained using a large number of annotated training images per object category. In another example, other methods are based on matching a scanning window template. However, such methods require significant computational resources, for example, memory storage (e.g., to store the large amount of annotated training data), and/or processing time (e.g., to check each object category at all locations of the image).

SUMMARY

According to a first aspect, a computed implemented method of identifying a plurality of target objects in a digital image, comprises: receiving a digital image including a plurality of target objects, extracting a plurality of query descriptors from respective a plurality of locations in the digital image, comparing each one of said plurality of query descriptors with a plurality of training descriptors for identifying a plurality of matching training descriptors, each one of the plurality of training descriptors is associated with one of a plurality of reference object identifiers and with relative location data comprising an estimated distance and an estimated direction from a center point of a reference object indicated by the respective associated reference object identifier, computing a plurality of object-regions of the digital image by clustering the query descriptors having common center points defined by the matching training descriptors, each object-region approximately bounding one target object of the plurality of target objects of the image, each object-region associated with a center point, wherein the plurality of object-regions are computed independently of the identifier of the reference object associated with each of the plurality of object-regions, and classifying the target object of each object-region of the plurality of object-regions according to the reference object identifier of the respective cluster according to a statistically significant correlation requirement between the common center point of the respective cluster and the center point of the reference object associated with the reference object identifier of the respective cluster.

According to a second aspect, a system for identifying a target object in a digital image, comprises: a non-transitory memory having stored thereon a code for execution by at least one hardware processor of a computing device, the code comprising: code for extracting a plurality of query descriptors from respective a plurality of locations in the digital image, code for comparing each one of said plurality of query descriptors with a plurality of training descriptors for identifying a plurality of matching training descriptors, each one of the plurality of training descriptors is associated with one of a plurality of reference object identifiers and with relative location data comprising an estimated distance and an estimated direction from a center point of a reference object indicated by the respective associated reference object identifier, code for computing a plurality of object-regions of the digital image by clustering the query descriptors having common center points defined by the matching training descriptors, each object-region approximately bounding one target object of the plurality of target objects of the image, each object-region associated with a center point, wherein the plurality of object-regions are computed independently of the identifier of the reference object associated with each of the plurality of object-regions, and code for classifying the target object of each object-region of the plurality of object-regions according to the reference object identifier of the respective cluster according to a statistically significant correlation requirement between the common center point of the respective cluster and the center point of the reference object associated with the reference object identifier of the respective cluster.

According to a third aspect, a computer program product for identifying a target object in a digital image, comprises: a non-transitory memory having stored thereon a code for execution by at least one hardware processor of a computing device, the code comprising: instructions for extracting a plurality of query descriptors from respective a plurality of locations in the digital image, instructions for comparing each one of said plurality of query descriptors with a plurality of training descriptors for identifying a plurality of matching training descriptors, each one of the plurality of training descriptors is associated with one of a plurality of reference object identifiers and with relative location data comprising an estimated distance and an estimated direction from a center point of a reference object indicated by the respective associated reference object identifier, instructions for computing a plurality of object-regions of the digital image by clustering the query descriptors having common center points defined by the matching training descriptors, each object-region approximately bounding one target object of the plurality of target objects of the image, each object-region associated with a center point, wherein the plurality of object-regions are computed independently of the identifier of the reference object associated with each of the plurality of object-regions, and instructions for classifying the target object of each object-region of the plurality of object-regions according to the reference object identifier of the respective cluster according to a statistically significant correlation requirement between the common center point of the respective cluster and the center point of the reference object associated with the reference object identifier of the respective cluster.

The systems and/or methods and/or code instructions stored in a storage device executed by one or more processors described herein provide a technical solution to the technical problem of classifying target objects within an image. The technical problem may relate to identification of categories of target objects within the image from a large number of categories (e.g., 1000-10000). The technical problem is especially challenging in scenarios that require identifying a large number (e.g., 1000-10000, or more) of visually similar (e.g., fine grained) categories for which only a few examples are available. In particular, the technical problem may relate to using a small number of training images per object category, for example, one image, two images, or 3-5 images, or other number of images. The small number of training images used by the systems and/or methods described herein is in contrast to other existing methods, for example, deep learning methods, that use a large annotated dataset for training. Such existing deep learning methods cannot perform statistically significant detection of object categories using a single (or other small number) of training images per category.

The systems and/or methods and/or code instructions stored in a storage device executed by one or more processors described herein improve performance of a computing unit that identifies target objects within an image, by reducing data storage requirements of storing training images (and/or storing training descriptors extracted from the training images). For example, the identification of the target object may be performed with a little as a single training image per object category, in comparison to other methods that require a large number of training images per object category (e.g., at least 100, or 1000). The performance of the computing unit is further in terms of reduced processor utilization, reduced processing resources, and/or reduced processing time (e.g., using existing processing resources) for identifying the category of the target object, for example, by reducing the computational time and/or computational resources for matching query descriptors extracted from the object with stored training descriptors extracted from the training object category images.

In a first possible implementation form of the method according to the first aspect or the system according to the second aspect or the computer program product according to the third aspect, each object-region is further associated with a scale relative to a reference object size, and each object-region of the plurality of object regions is computed by: aggregating the relative location data of the matching training descriptors to generate a Kernel Density Estimate (KDE) for a plurality of posterior probability maps of the center point and scale of each respective reference object of a plurality of reference object identifiers, aggregating the posterior probability maps into a plurality of probability map clusters, extracting each of the plurality of object-regions with inter-scale normalization and non-maximal suppression according to location of the center point and the scale of each respective cluster of the plurality of probability map clusters, wherein each of the plurality of object-regions is defined according to the center point and scale of the reference object of the plurality of reference objects associated with the respective cluster of the plurality of probability map clusters.

In a second possible implementation form of the method or the system or the computer program product according to the preceding first implementation forms of the first or second or third aspects, the plurality of probability map clusters are each represented as an x-y-s-3D-heatmap having a center point at a location with coordinates defined by an a-axis (x) and a y-axis (y) and defined by a scale (s).

In a third possible implementation form of the method or the system or the computer program product according to the first or second or third aspects as such or according to any of the preceding implementation forms of the first or second or third aspects, each one of the plurality of training descriptors is associated with an estimated scale of one level of a plurality of levels of a Gaussian pyramid, and wherein the scale of the object-region is computed based on the estimated scale of the one level of the plurality of levels of the Gaussian pyramid of the identified matching; training descriptor, wherein the object-regions are computed by clustering according to the scale defined by the matching training descriptors.

The support for the rest of the scales is achieved at query time by down-scaling the query image by a factor of 0.5 in a loop until minimal vertical size is reached, which provides a running time that is $\leq 1.5\times$ the running time of $I_q$ processed in its original scale alone.

In a fourth possible implementation form of the method or the system or the computer program product according to the first or second or third aspects as such or according to any of the preceding implementation forms of the first or second or third aspects, the method further comprises, and/or the system and/or computer program product further comprise code instructions for: selecting, for each target object of each object-region, a sub-group of candidate reference object identifiers based on a cluster of query descriptors associated with the respective object region, computing a probability of each member of the sub-group of candidate reference object identifiers being the respective target object, and classifying the target object of each object-region of the plurality of object-regions according to the member of the sub-group with the highest computed probability.

In a fifth possible implementation form of the method or the system or the computer program product according to the preceding fourth implementation forms of the first or second or third aspects, the probability of each member of the sub-group of candidate reference object identifiers is computed based on one or more of the following components: a data fidelity value that penalizes distance between the query descriptor and the plurality of matching training descriptors, a penalty for deviation in expected spatial location between the common center point and the center of the reference object associated with the plurality of matching training descriptors, and discrepancy in scale between the target object and the reference object associated with the plurality of matching training descriptors.

In a sixth possible implementation form of the method or the system or the computer program product according to the first or second or third aspects as such or according to any of the preceding implementation forms of the first or second or third aspects, the plurality of training descriptors are extracted from a training set comprising a single training sample image of each of the plurality of reference objects associated with each of the plurality of reference object identifiers.

In a seventh possible implementation form of the method or the system or the computer program product according to the preceding sixth implementation forms of the first or second or third aspects, the plurality of image descriptions are extracted from each single training sample image of each of the plurality of reference objects in a sampling pattern that is denser relative to the pattern of the plurality of locations in the digital image.

In an eighth possible implementation form of the method or the system or the computer program product according to the first or second or third aspects as such or according to any of the preceding implementation forms of the first or second or third aspects, the plurality of training descriptors are indexed with a sub-linear search data structure, and the comparing is performed by searching for the matching training descriptor of the extracted query descriptor within the sub-linear search data structure. The sub-linear nature of the search provides a running time that is not significantly affected by the increase in the number of indexed training descriptors. Sampling training descriptors at multiple scales (i.e., multiple pyramid level) does not significantly increase the search time.

In a ninth possible implementation form of the method or the system or the computer program product according to the first or second or third aspects as such or according to any of the preceding implementation forms of the first or second or third aspects, the extracted query descriptor and each of the plurality of training descriptors is based on the scale invariant feature transform (SIFT) method.

In a tenth possible implementation form of the method or the system or the computer program product according to the first or second or third aspects as such or according to any of the preceding implementation forms of the first or second or third aspects, the comparing is performed by finding a set of Euclidean nearest neighbors of the respective extracted query descriptor, wherein each member of the set of Euclidean nearest neighbors is a certain matching training descriptor.

In an eleventh possible implementation form of the method or the system or the computer program product according to the preceding tenth implementation forms of the first or second or third aspects, the set of Euclidean nearest neighbors are identified for a first subset of the query descriptors, wherein a second subset of query descriptors are unmatched, wherein for each member of the second subset of query descriptors that are unmatched, a matching training descriptor is computed such that the difference between the center point of the relative location data of the identified matching training descriptor and the center point of the relative location data of the computed training descriptor matched to the unmatched query descriptor is equal to the difference between the location relative location of the query descriptor matched to the identified matching training descriptor and the location relative location of the unmatched query descriptor for which the matching training descriptor is computed.

In a twelfth possible implementation form of the method or the system or the computer program product according to the preceding eleventh implementation forms of the first or second or third aspects, each member of the second subset of query descriptors that are unmatched is paired to a closest single already matched query descriptor of the first subset of query descriptors according to a distance requirement.

The pairing with the single already matched query descriptor reduces computations, improving computational performance of the computing device.

In a thirteenth possible implementation form of the method or the system or the computer program product according to the preceding eleventh implementation forms of the first or second or third aspects, the method further comprises, and/or the system and/or computer program product further comprise code instructions for iterating the computing of the matching training descriptor for each unmatched query descriptor of the second subset of query descriptors, wherein the probability of extending the match from the nth closest members of the first subset of query descriptors is mathematically represented as $(1-p)p^{n-1}$, where p denotes the probability of independently ignoring each previously matched query descriptor.

The matching is extended from multiple nearby query descriptors rather than just from the spatially closest query descriptor.

In a fourteenth possible implementation form of the method or the system or the computer program product according to the first or second or third aspects as such or according to any of the preceding implementation forms of the first or second or third aspects, the method further comprises, and/or the system and/or computer program product further comprise code instructions for: providing, to a deep Convolutional Neural Network (CNN), the plurality of clusters of reference object identifiers and respective computed probabilities of each respective target object associated with each cluster of reference object identifiers, computing, by the CNN, a confidence value for each reference object identifier in the plurality of clusters of reference object identifiers, adjusting each computed probability, by multiplying each respective probability by the corresponding confidence value computed by the CNN, and classifying the target object according to the adjusted computed probabilities of the respective target object associated with each cluster of the plurality of clusters of reference object identifiers.

It is noted that full training of the CNN based on standard methods is not performed due to the limited number of training images per object category, optionally a single image per object category.

In a fifteenth possible implementation form of the method or the system or the computer program product according to the preceding fourteenth implementation forms of the first or second or third aspects, the CNN is trained with an expanded training set of training images created by random combinations of learned geometric and photometric transformations of a single training image sample for each reference object of the plurality of reference objects associated with the plurality of reference object identifiers.

In a sixteenth possible implementation form of the method or the system or the computer program product according to the first or second or third aspects as such or according to any of the preceding implementation forms of the first or second or third aspects, the digital image is one of a plurality of frames in a video, and further comprising performing temporal integration of each respective computed object-region and each designated target object for each digital image of the plurality of frames.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
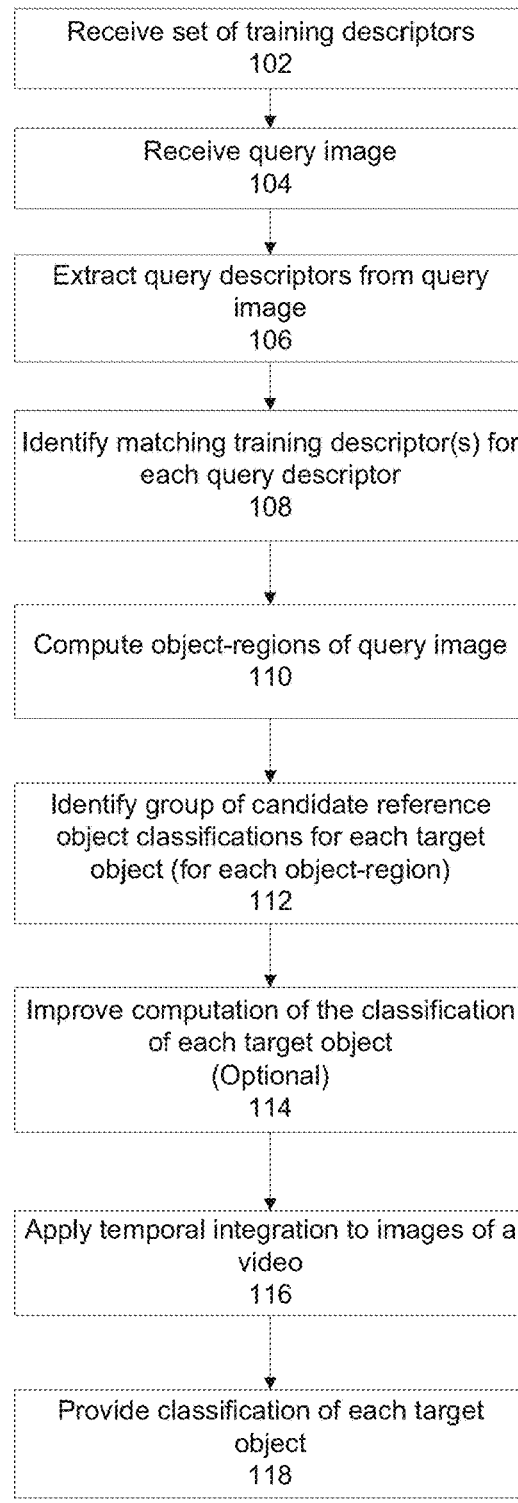
FIG. 1 is a flowchart of a method that classifies target objects in a query image based on relative location data of training descriptors matched to query descriptors extracted from the query image, in accordance with some embodiments of the present invention.

The present invention, in some embodiments thereof, relates to image processing and, more specifically, but not exclusively, to systems and methods for identifying objects in images.

An aspect of some embodiments of the present invention relates to systems and/or methods and/or code instructions stored in a storage device executed by one or more processors that classify a target object in an image (also referred to herein as a query image) according to relative location data of training descriptors matched with query descriptors extracted from a digital image of the target object. The query descriptors, which are extracted from multiple locations of the image, are matched to training descriptors. Each training descriptor is associated with a certain reference object identifier, and with relative location data defining an estimated displacement (optionally defined as estimated distance and an estimated direction) and optionally an estimated scale from a center point of a reference object indicated by the respective associated reference object identifier. Multiple object-regions of the query image are computed by clustering the query descriptors having common center points defined by the matching training descriptors. Each object-region approximately bounds one target object of the image. Each object-region is associated with a center point. The object-regions are computed independently of the identifier of the reference object associated with each respective object-region. Each common center point denotes a respective reference object. Each common center point is associated with a reference object category, which is a candidate for identifying the category of the target object. For example, one center point represents the category milk based on the category of the training descriptors of the query descriptor(s) of the cluster, and another center point represents the category bread based on another category of other training descriptors of other query descriptor(s) of the cluster. The target object is classified according to the reference object classifier of the cluster for which the training descriptors member point towards the common center. When multiple clusters are identified, each having a different common center point, one or more clusters which satisfy a statistically significant correlation requirement between the respective common center point of the cluster and the center point of the reference object associated with the reference object identifier of the cluster is selected. It is noted that multiple clusters having statistically significant correlations meeting the requirement may be selected, rather than selection of one cluster with the greatest statistically significant correlation value. Alternatively, the cluster with the greatest statistically significant correlation value is selected.

The image may include multiple instances of each target object classification, for example, multiple retail products of each target object category (e.g., tooth paste, cereal box, milk carton) arranged on one or more shelves.

Optionally, the reference object category of the cluster associated with the highest probability of training descriptor members associated with the common center point that correlates with the center point of the reference object is selected, and used to classify the target object (within the object-region). Alternatively or additionally, the reference object category of the group is selected by a deep Convolutional Neural Network (CNN) that is trained on an expanded training set of training images created by random combinations of learned geometric and photometric transformations of a single training image sample for each reference object.

Optionally, the object-regions are computed independently of the category of the reference object associated with each of the plurality of object-regions.

Optionally, the training descriptors are extracted from a training set that includes a single training sample image of each reference object.

Optionally, the matching training descriptors are found for each visual image by searching a sub-linear search data structure storing indexed training descriptors. A set of Euclidean nearest neighbors of the respective extracted query descriptor are found. Each object-region is computed is based on an averaged contribution of each member of the set of Euclidean nearest neighbors.

The systems and/or methods and/or code instructions stored in a storage device executed by one or more processors described herein provide a technical solution to the technical problem of classifying target objects within an image. The technical problem may relate to identification of categories of target objects within the image from a large number of categories (e.g., 1000-10000). The technical problem is especially challenging in scenarios that require identifying a large number (e.g., 1000-10000, or more) of visually similar (e.g., fine grained) categories for which only a few examples are available. In particular, the technical problem may relate to using a small number of training images per object category, for example, one image, two images, or 3-5 images, or other number of images. The small number of training images used by the systems and/or methods described herein is in contrast to other existing methods, for example, deep learning methods, that use a large annotated dataset for training. Such existing deep learning methods cannot perform statistically significant detection of object categories using a single (or other small number) of training images per category.

The systems and/or methods and/or code instructions stored in a storage device executed by one or more processors described herein are may be used to solve a particular problem in the application domain of identifying retail products in an image (e.g., multiple instances each of multiple retail products on multiple shelves). In such cases, there may just be a single studio image example of each retain product available for training. In another example, brand logos are detected in the image. The systems and/or methods (e.g., code instructions stored in a storage device executed by one or more processors) described herein related to the technical problem of robust and scalable retail products recognition in unconstrained realistic conditions.

The systems and/or methods and/or code instructions stored in a storage device executed by one or more processors described herein improve performance of a computing unit that identifies target objects within an image, by reducing data storage requirements of storing training images (and/or storing training descriptors extracted from the training images). For example, the identification of the target object may be performed with a little as a single training image per object category, in comparison to other methods that require a large number of training images per object category (e.g., at least 100, or 1000). The performance of the computing unit is further in terms of reduced processor utilization, reduced processing resources, and/or reduced processing time (e.g., using existing processing resources) for identifying the category of the target object, for example, by reducing the computational time and/or computational resources for matching query descriptors extracted from the object with stored training descriptors extracted from the training object category images.

The systems and/or methods and/or code instructions stored in a storage device executed by one or more processors described herein improve an underlying technical process within the technical field of image processing, in particular, within the field of automatic detection and recognition of target objects within an image. The systems and/or methods (e.g., code instructions stored in a storage device executed by one or more processors) described herein improve the process of fine-grained classification, by identifying objects that are similar to one another, or a large number of objects of a common type, for example, multiple instances of the same retail product on a shelf, which may be packaged using slightly different versions of packages.

The systems and/or methods and/or code instructions stored in a storage device executed by one or more processors described herein are tied to physical real-life components, including a camera that captures the image that is analyzed to identify the category of each target object within the image, and a data storage device that stores a repository of training descriptors extracted from training images.

Accordingly, the systems and/or methods described herein are inextricably tied to computing technology and/or physical components (i.e., camera) to overcome an actual technical problem arising in processing of digital images.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the terms class, category and identifier, and classification and categorization and indication are used interchangeably with reference to identification of target objects in the image.

As used herein, the term displacement may sometimes be interchanged with the phrase referring to estimated distance and an estimated direction.

The systems and/or methods and/or code instructions stored in a storage device executed by one or more processors described herein perform recognition and classification of target objects in an image using a small training set, of as little as a single training image per object category. The classification may be performed for objects having small intra-class variation.

For example, other methods have focused on natural object categories with substantial intra-class variations. Typically, the number of categories is up to a thousand, using rich training data with a large number of images per object category. Examples of such methods, such as deep learning based methods, are described with reference to the following: C. Szegedy, A. Toshev, and D. Erhan. *Deep neural networks for object detection*. In C. J. C. Burges, L. Bottou, M. Welling, Z Ghahramani, and K. Q. Weinberger, editors, *Advances in Neural Information Processing Systems* 26, pages 2553-2561. Curran Associates, Inc., 2013. K. Chatfield, K Simonyan, A. Vedaldi, and A. Zisserman. *Return of the devil in the details: Delving deep into convolutional nets. In British Machine Vision Conference*, 2014. S. Ren, K He, R. Girshick, and J. Sun. *Faster R-CNN: Towards real-time object detection with region proposal networks*. In C. Cortes, N. D. Lawrence, D. D. Lee, M. Sugiyama, and R. Garnett, editors, *Advances in Neural Information Processing Systems* 28, pages 91-99. Curran Associates, Inc., 2015. J. Redmon, S. K. Divvala, R. B. Girshick, and A. Farhadi. *You only look once: Unified, real-time object detection. CoRR,* abs/1506.02640, 2015. According to Chatfield at el., a convolutional neural network (CNN) is used to classify region proposals provided by an external detector. In Ren et al., both the region proposal and the classification are produced by a single end-to-end network.

Deep learning requires a large training set, with a large number of labeled examples per category that are sufficiently similar to the objects in the received image. Training with a single (or other small number) example per category, as described herein, poses a challenge for such existing methods. Similarly, a single example per category cannot be adequately implemented by classical general purpose object detectors, for example, as described with reference to the following: P. F. Felzenszwalb, R. B. Girshick, D. McAllester, and D. Ramanan. *Object detection with discriminatively trained partbased models. IEEE Transactions on Pattern Analysis and Machine Intelligence,* 32(9):1627-1645, September 2010. S. Lazebnik, C. Schmid, and J. Ponce. *Beyond bags of features: Spatial pyramid matching for recognizing natural scene categories. In Proceedings of the* 2006 *IEEE Computer Society Conference on Computer Vision and Pattern Recognition*—Volume 2, CVPR '06, pages 2169-2178, Washington, D.C., USA, 2006. IEEE Computer Society.

The systems and/or methods described herein operate differently and/or provide technical advantages over other methods that attempt to use small training sets. For example, according to F.-F. Li, R. Fergus, and P. Perona. *One-shot learning of object categories. IEEE Transactions on Pattern Analysis and Machine Intelligence,* 28(4):594-611, April 2006, each object category is represented using a probabilistic Constellation model. Model parameters are first learned for a generic category on sufficiently large training data. Models for individual categories are obtained by tuning the parameters using the few available examples. Therefore, in contrast to the systems and/or methods described herein that may train using the single image per category, a large training dataset is initially required. Additional works that explore the problem of one-shot learning for character recognition are designed for character recognition and therefore are not extendible to general object recognition. Examples of methods that perform character recognition based on one shot-learning include E. G. Miller, N. E. Matsakis, and P. A. Viola. *Learning from one example through shared densities on transforms. In Computer Vision and Pattern Recognition,* 2000. *Proceedings. IEEE Conference on*, volume 1, pages 464-471 vol. 1, 2000. B. M. Lake, R. R. Salakhutdinov, and J. Tenenbaum. *Oneshot learning by inverting a compositional causal process*. In C. J. C. Burges, L. Bottou, M. Welling, Z Ghahramani, and K. Q. Weinberger, editors, *Advances in Neural Information Processing Systems* 26, pages 2526-2534. Curran Associates, Inc., 2013. A. Wong and A. L. Yuille. *One shot learning via compositions of meaningful patches. In The IEEE International Conference on Computer Vision (ICCV), December* 2015. The cited works focus on the problem of object recognition, where the target object (to be recognized) is assumed to appear roughly cropped on the query image (i.e., occupying all or most of the image). In contrast, the systems and/or methods described herein process images in which the target objects appear in arbitrary locations and/or scales and may be significantly smaller than the image (e.g., 2.5% of the total number of image pixels). The systems and/or methods described herein detect (i.e., localize) objects (e.g., bounding boxes) in addition to simply recognizing the objects. In addition, the aforementioned other methods are designed to process a much more simplified imaging domain of handwritten characters, which is significantly computationally simpler than the objects described herein (e.g., retail products) and do not include the very large amounts of classes (e.g., 20-30 characters by the other methods in comparison to 1000-10000 objects by the systems and/or methods described herein).

The systems and/or methods described herein operate differently and/or provide technical advantages over other methods that perform a nearest neighbor (NN) search, for example, as described by the following: M. Muja and D. G. Lowe. *Scalable nearest neighbor algorithms for high dimensional data. Pattern Analysis and Machine Intelligence, IEEE Transactions on,* 36, 2014. Y. Weiss, R. Fergus, and A. Torralba. *Computer Vision—ECCV 2012: 12th European Conference on Computer Vision,* Florence, Italy, Oct. 7-13, 2012, *Proceedings, Part V, chapter Multidimensional Spectral Hashing,* pages 340-353. Springer Berlin Heidelberg, Berlin, Heidelberg, 2012. O. Boiman, E. Shechtman, and M. Irani. *In defense of nearest-neighbor based image classification. In Computer Vision and Pattern Recognition,* 2008. CVPR 2008. IEEE Conference on, pages 1-8, June 2008 L. Karlinsky, M. Dinerstein, D. Harari, and S. Ullman. *The chains model for detecting parts by their context. In Computer Vision and Pattern Recognition (CVPR),* 2010 IEEE Conference on, pages 25-32. IEEE, 2010. In contrast to the cited methods, the systems and/or methods described herein use a nonparametric probabilistic model for the initial detection and classification. The various probabilities are computed using a variant of efficient sub-linear nearest neighbor search, using added unobserved variables to support efficient multi-scale and multi-class fine-grained detection and recognition. A sequential inference procedure accommodates for the extremely large search space of possible assignments to the unobserved variables of the model. The NN search describe herein may search, for example, or hundreds of thousands of image patch descriptors within a set of millions, in less than a second per mega-pixel.

The systems and/or methods described herein operate differently and/or provide technical advantages over other methods that relate to data with little intra-class variation, for example, instance recognition methods based on template matching techniques. As described in the examples section, the systems and/or methods described herein outperformed the method and system described by M. George and C. Floerkemeier. Recognizing products: A per-exemplar multi-label image classification approach. Computer Vision ECCV 2014, which outperformed template matching methods described by the following: J. Kim, C. Liu, F. Sha, and K Grauman. *Deformable spatial pyramid matching for fast dense correspondences*. In CVPR, pages 2307-2314. IEEE Computer Society, 2013. F. Perronnin, Y. Liu, J. Snchez, and H. Poirier. H (2010a) *large-scale image retrieval with compressed fisher vectors*. In: CVPR Perronnin F, Snchez J, Liu Y (2010b) Largescale. H. Jegou, M. Douze, and C. Schmid. *Hamming embedding and weak geometric consistency for large scale image search. In Proceedings of the* 10*th European Conference on Computer Vision*: Part I, ECCV '08, pages 304-317, Berlin, Heidelberg, 2008. Springer-Verlag.

The systems and/or methods described herein operate differently and/or provide technical advantages over other methods that relate to fine-grained recognition. For example, the method described with reference to S. Yang, L. Bo, J. Wang, and L. G. Shapiro. *Unsupervised template learning for fine-grained object recognition*. In F. Pereira, C. J. C. Burges, L. Bottou, and K. Q. Weinberger, editors, *Advances in Neural Information Processing Systems* 25, pages 3122-3130. Curran Associates, Inc., 2012 relates to the classical approach, and the methods described with reference to the following: N. Zhang, J. Donahue, R. Girshick, and T Darrell. *Computer Vision—ECCV* 2014: 13th European Conference, Zurich, Switzerland, Sep. 6-12, 2014, Proceedings, Part I, *chapter Part-Based R-CNNs for Fine-Grained Category Detection*. 2014. J. Wang, Y. Song, T Leung, C. Rosenberg, J. Wang, J. Philbin, B. Chen, and Y. Wu. *Learning fine-grained image similarity with deep ranking. In Proceedings of the* 2014 *IEEE Conference on Computer Vision and Pattern Recognition*, CVPR '14, pages 1386-1393, Washington, D.C., USA, 2014. IEEE Computer Society are exemplary deep learning methods. To disambiguate similar categories the methods described by Yang et al., and Zhang et al., appear to detect object parts and decide on the category labels based on rectified images of these parts. The method described by Wang et al. appears to trains a deep model using triplet loss. In contrast, the systems and/or methods described herein relate to a DNN classifier for fine-grained refinement. During training, the DNN's learning capacity is focused on discriminating between the strongest candidates initially identified as probably candidate categories for the target object, which often represent similar object categories.

As described herein in additional detail, the systems and/or methods described herein use data synthesis to train the DNN. In addition to common methods for augmentation of training data to produce new images using translations, mirror reflections, and adding Gaussian noise, for example, as described with reference to A. Krizhevsky, I. Sutskever, and G. E. Hinton. *Imagenet classification with deep convolutional neural networks,* 2012, the systems and/or methods described herein use random homographies to generate new versions of each training image and learned linear filters to degrade the high-quality training studio images for a more realistic appearance.

Methods for detecting and recognizing retail products in images are rather limited compared to general purpose techniques. Exemplary methods are described with reference to the following: S. S. Tsai, D. Chen, V. Chandrasekhar, G. Takacs, N.-M. Cheung, R. Vedantham, R. Grzeszczuk, and B. Girod. *Mobile product recognition. In Proceedings of the* 18*th ACM International Conference on Multimedia, MM* '10, pages 1587-1590, New York, N.Y., USA, 2010. ACM. M. George and C. Floerkemeier. *Recognizing products: A per-exemplar multi-label image classification approach. Computer Vision ECCV* 2014. M. Merler, C. Galleguillos, and S. Belongie. *Recognizing groceries in situ using in vitro training data. In Computer Vision and Pattern Recognition,* 2007. CVPR '07. IEEE Conference on, pages 1-8, June 2007. T Winlock, E. Christiansen, and S. Belongie. *Toward realtime grocery detection for the visually impaired. In Computer Vision and Pattern Recognition Workshops (CVPRW),* 2010 *IEEE Computer Society Conference on,* pages 49-56, June 2010. George et al. appears to relate to detecting 3235 grocery products in still images. The method described with reference to George et al. appears to be based on a short-list of possible categories that is first estimated using random forests, applied on a regular grid of subwindows. The training images of the identified categories are then matched, one by one, to localize and recognize the products. In contrast, the systems and/or method described herein first localize the objects regardless of their category, and only then perform classification by re-using (for efficiency) the computations from the first step. The method described with reference to Merler et al. appears to relate to comparing the performance of different descriptors on the dataset containing 120 products and 28 in-store test videos.

Figure 2:
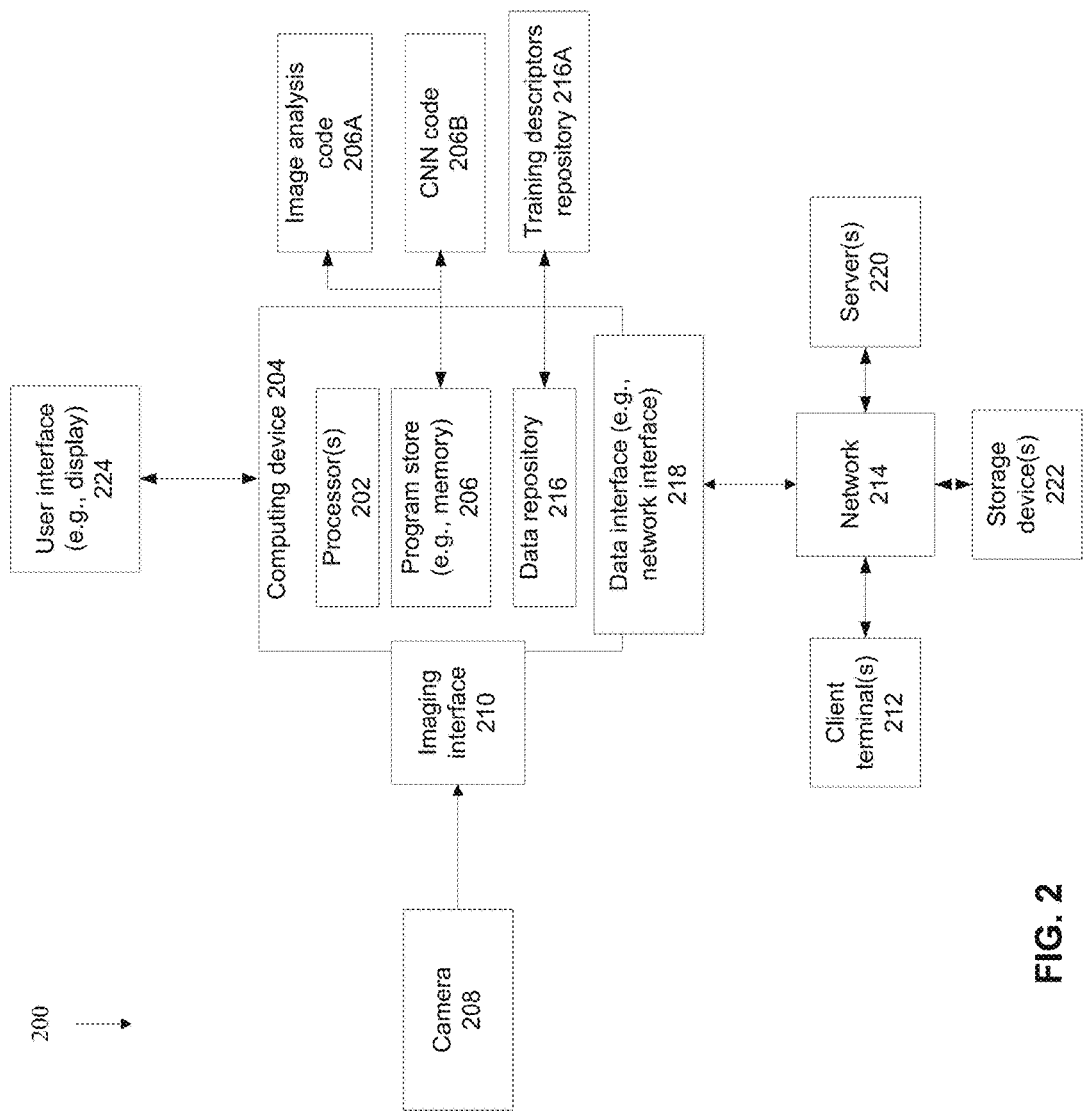
FIG. 2 is a is a block diagram of components of a system that classifies target objects in the image based on relative location data of training descriptors matched to query descriptors extracted from the image, in accordance with some embodiments of the present invention.

Reference is now made to FIG. 1, which is a flowchart of a method that categorizes target objects in an image based on relative location data of training descriptors matched to query descriptors extracted from the image, in accordance with some embodiments of the present invention. Reference is also made to FIG. 2, which is a block diagram of components of a system 200 that classifies target objects in the image based on relative location data of training descriptors matched to query descriptors extracted from the image, in accordance with some embodiments of the present invention. System 200 may implement the acts of the method described with reference to FIG. 1, by processor(s) 202 of a computing device 204 executing code instructions stored in a program store 206.

Computing device 204 receives an image for processing (i.e., to identify the categories of target objects within the image) captured by a camera 208. The image may be provided by camera 208 and/or stored on a storage device. Camera 208 may be implemented as, for example, a digital camera, a video camera, and an imaging sensor. Camera 208 may capture two dimensional digital images (2D), in color (e.g., red, green, blue based) and/or in black and white. Camera 208 may capture 3D image, which may be processed to create 2D images (e.g., slices) for processing.

Computing device 204 receives the image(s) captured by camera 208 via one or more image interface(s) 210, for example, a wire connection, a wireless connection, other physical interface implementations, and/or virtual interfaces (e.g., software interface, application programming interface (API), software development kit (SDK)).

Computing device 204 may be implemented as, for example, a client terminal, a server, a computing cloud, a mobile device, a desktop computer, a thin client, a Smartphone, a Tablet computer, a laptop computer, a wearable computer, glasses computer, and a watch computer. Computing device 204 may include locally stored software that performs one or more of the acts described with reference to FIG. 1, and/or may act as one or more servers (e.g., network server, web server, a computing cloud) that provides services (e.g., one or more of the acts described with reference to FIG. 1) to one or more client terminals 212 over a network 214, for example, providing software as a service (SaaS) to the client terminal(s) 212, providing an application for local download to the client terminal(s) 212, and/or providing functions via a remote access session to the client terminals 212, such as through a web browser.

Processor(s) 202 of computing device 204 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 204 may include one or more processors (homogenous or heterogeneous), which may be arranged for parallel processing, as clusters and/or as one or more multi core processing units.

Storage device (also known herein as a program store, e.g., a memory) 206 stores code instructions implementable by processor(s) 202, for example, a random access memory (RAM), read-only memory (ROM), and/or a storage device, for example, non-volatile memory, magnetic media, semi-conductor memory devices, hard drive, removable storage, and optical media (e.g., DVD, CD-ROM). Storage device 206 stores image analysis code instructions 206A that executes one or more acts of the method described with reference to FIG. 1. Storage device may store code of a deep convolutional network (CNN) that selects the target reference object, as described herein.

Computing device 204 may include a data repository 216 for storing data, for example, a training descriptor repository 216A that stores training descriptors extracted for each training image for matching to query descriptors extracted from the image, as described herein. Data repository 216 may be implemented as, for example, a memory, a local hard-drive, a removable storage unit, an optical disk, a storage device, and/or as a remote server and/or computing cloud (e.g., accessed via a network connection). It is noted that training descriptors of repository 216A may be stored in data storage device 206, for example, executing portions are loaded from data repository 216 into data storage device 206 for execution by processor(s) 202.

Computing device 204 may include a network interface 218 for connecting to network 214, for example, one or more of, a network interface card, a wireless interface to connect to a wireless network, a physical interface for connecting to a cable for network connectivity, a virtual interface implemented in software, network communication software providing higher layers of network connectivity, and/or other implementations. Computing unit 204 may access one or more remote servers 220 and/or storage devices 222 via network 214, for example, to download additional training images of additional object categories, and/or to provide the identification of the categories of the target images in the received image.

Computing device 204 may connect via network 214 (or another communication channel, such as through a direct link (e.g., cable, wireless) and/or indirect link (e.g., via an intermediary computing unit such as a server, and/or via a storage device) with one or more of:

- Client terminal(s) 212, for example, when computing device 204 acts as a server providing SaaS. The client terminals 212 may each provide one or more images to computing device 204 for analysis over network 214. It is noted that camera 208 (and/or a storage device storing the captured image) may be connected to client terminal 212, providing the image via network 214.
- Remotely located server 220 that receives the identified image object categories in the image. Server 220 may locally display the identified object category results, store the results, and/or transmit the results to another server.
- Storage device 222 that stores one or more of: images captured by camera(s) 208, training image(s) of sample objects representing additional categories, and/or the identified object category results. Storage device 222 may include, for example, a storage server, a computing cloud storage server, or other implementations.

Computing device 204 includes or is in communication with a user interface 224 allowing a user to enter data (e.g., designate the image) and/or view presented data (e.g., view the image annotated with object categories and/or boundaries representing identified objects). Exemplary user interfaces 224 include, for example, one or more of, a touchscreen, a display, a keyboard, a mouse, and voice activated software using speakers and microphone.

Referring now back to FIG. 1, at 102, a set of training descriptors is received. The set of training descriptors are stored, for example, in training descriptors repository 216A.

The set of training descriptors is optionally created by computing device 204 from a received training set of images. The set of training images is mathematically represented herein as $\{I_t\}$. The training set includes a sample of one or more images each representing a category of a reference object. The number of images per category may be small, for example, a single image, two images, three image, four images, or five images. The number of images per category may be smaller than required by traditional learning methods to achieve a statistically significant categorization that is similar to the probability of categorization achieved by the systems and/or methods described herein. For example, the systems and/or methods described herein, using a single image per category of reference objects, may achieve a similar probability of classification as other learning methods trained using at least 100 images per reference category.

The training set includes training descriptors extracted from each of the images. In terms of mathematical representation, $\{F^i_t\}$ denotes the set of all training descriptors collected extracted from $\{I_t\}$.

Each image description is associated (e.g., tagged, annotated, stored in association with metadata) with the category of the reference object from which the respective image description is extracted from.

The training set may be stored, for example, locally by computing device 204 (e.g., in repository 216A, within data repository 216), and/or externally in a storage device and/or storage server.

The training set may be created by computing device 204 by extracting the training descriptors from the set of training images, and/or created by another computing device.

The training descriptors are extracted from each sample image according to a sampling pattern. The sampling pattern may be uniform, for example, based on adjacent boxes having a uniform size, for example, a base step based on a predefined number of pixels, for example, 4 pixels, 10 pixels, or other values. The sampling pattern may be based on a predefined pattern, for example, a grid of 24×24 patches, a grid of 50×50 patches, or other values. The sampling pattern may be random.

Optionally, the training descriptors are extracted from each sample image in a sampling pattern that is denser than the sampling pattern used to extract query descriptors from the received image (as described herein). For example, the ratio between the sampling pattern of extraction of query descriptors relative to the sampling pattern of extraction of training descriptors is 1:1.2, 1:1.5, 1:2, 1:5, 1:10, or other values.

It is noted that a training image that includes multiple reference objects may be divided (e.g., cropped) into sub-images each including one of the reference objects. Training descriptors may be extracted from each sub-image.

Exemplary images descriptors are based on the scale invariant feature transform (SIFT) method, for example, greyscale SIFT (e.g., as described with reference to D. G. Lowe. *Distinctive image features from scale-invariant keypoints. Int. J. Comput. Vision,* 60(2):91-110, November 2004. B. Fulkerson, A. Vedaldi, and S. Soatto. *Localizing objects with smart dictionaries. In Proceedings of the 10th European Conference on Computer Vision*: Part I, ECCV '08, pages 179-192, Berlin, Heidelberg, 2008. Springer-Verlag.), dense grayscale SIFT, and color SIFT. Other exemplary training descriptors may be based on, for example, color, shape, and texture.

It is noted that initial detection and recognition of target objects performed in greyscale has higher resilience to color variation, for example, due to lighting and camera changes. Use of grayscale images (training images and/or image being analyzed) may improve computational performance and/or accuracy of classification of target objects in comparison to use of color images.

Optionally, multiple scales of each training image of the set $\{I_t\}$ computed, for example, based on a pyramid structure, for example, a Gaussian pyramid. Training descriptors are extracted for each level of the pyramid. The extracted training descriptors are stored in association (e.g., tagged, annotated) with the level of the pyramid of the image from which the training descriptors were extracted. Exemplary pyramid level scales are in the range (0.5, 1], for example, {0.6, 0.8, 1}. The support for the rest of the scales is achieved at query time by down-scaling the query image by a factor of 0.5 in a loop until minimal vertical size is reached, which provides a running time that is ≤1.5×the running time of $I_q$ processed in its original scale alone. Each extracted training descriptor, mathematically represented herein as $F^i_t$, is stored with the following data metadata):

Category label (also referred to herein as identifier) of the reference object in the training image, mathematically represented as $l(F^i_t)=l(I_t)$.

Relative location of the extracted training descriptor $F^i_t$ within the reference object (and/or within the training image), optionally stored as relative location data include an estimated distance and an estimated direction from a center point of the reference object, mathematically represented as $o(F^i_t)$.

Optionally, the extracted training descriptor is further stored with:

Scale of the pyramid level from which the training descriptor $F^i_t$ is extracted, mathematically represented as $s(F^i_t)$.

The training descriptors may be annotated with metadata of the category, relative position, and optionally the scale. Other suitable data structures may be used, for example, a database.

The extracted training descriptors are indexed based on a data structure designed for performing an efficient search that matches an extracted query descriptor with one or more of the extracted training descriptors, optionally a sub-linear search data structure, for example, kd-trees, and/or locality sensitive hashing (LSH). The sub-linear nature of the search provides a running time that is not significantly affected by the increase in the number of indexed training descriptors. Sampling training descriptors at multiple scales (i.e., multiple pyramid level) does not significantly increase the search time.

At 104, a digital image (sometimes referred to herein as a query image) is received by computing device 204. The digital image is mathematically represented as $I_q$. The digital image is a 2D image. The digital image may be a 2D slice from a 3D image. The digital image may be a black and white image, and/or a color image (e.g., based on red, green, blue, or other methods). Color images may be converted into black and white images, and/or black and white based query descriptors may be extracted from the images. The digital image may be a captured still image, or a frame from a video.

The digital image may include multiple instances of each class of target object. For example, where the class of target object represents a retail item, for example, a box of a certain brand of tooth paste, a box of a certain breakfast cereal, and a can of a certain brand of sliced olives, the image may include multiple instances of each of the retail items, for example, on one or more shelves.

Computing device 204 may receive the image, for example, from: camera 208, client terminal(s) 212, storage device 222, and/or server 220.

Digital image is optionally stored in storage device 206 and/or data repository 216 for processing by processor(s) 202 of computing device 204, as described herein.

At 106, query descriptors are extracted from multiple locations in the query image. The method of extracted of the query descriptors is based on the method of extraction of the training descriptors from the training images, so that the query descriptors may be matched to training descriptors.

The query descriptors are extracted from the query image according to a sampling pattern. The sampling pattern may be uniform, for example, based on adjacent boxes having a uniform size, for example, a base step based on a predefined number of pixels, for example, 6 pixels, 10 pixels, 20 pixels, or other values. The sampling pattern may be based on a predefined pattern, for example, a grid of 20×20 patches, a grid of 15×15 patches, or other values. The sampling pattern may be random.

Optionally, the query descriptors are extracted from the query image in a sampling pattern that is sparser than the sampling pattern used to extract training descriptors from the training images.

Each extracted query descriptors is mathematically represented herein as $\{F^i_q\}$.

At 108, one or more training descriptors are identified for each query descriptor. Each one of the query descriptors is compared with multiple training descriptors for identifying matching training descriptors.

Optionally, the matching training descriptors are identified by performing a nearest neighbor search based on the data structure storing the training descriptors.

An exemplary nearest neighbor computation to identify the matching training descriptors is now described. The method identifies the K approximate nearest neighbors of each extracted query descriptor $F^j_q$ in the stored indexed training descriptors. For example, the GroZi-3.2K dataset includes 3.7K categories, 7M training descriptors, and 55K query descriptors are extracted for an average query image.

The exemplary nearest neighbor computation described herein is computationally more efficient than other search methods, in terms of computational processing time and/or computational resources (e.g., processor(s)) for performing the search. For example, searching based on a kdtree (e.g., as described with reference to Muja et al.) takes over 20 seconds on a modern PC, which is impractical.

The exemplary nearest neighbor computation uses the spectral hashing (e.g., as described with reference to Weiss et al.) based LSH method to identify statistically significant matching training descriptors according to a matching requirement, optionally the Euclidean nearest neighbors based on a Euclidean distance requirement, for example, ≤0.5 distance in L2-normalized descriptor space. The statistically significant matching training descriptors are identified for a subset of the extracted query descriptors, for example, for about 10%, about 20%, or about 30% of the total extracted query descriptors. The other extracted query descriptors remain unmatched (temporarily, as described below).

The exemplary nearest neighbor computation is based on the assumption that each of the reference objects in the query image has at least one matching training descriptor.

An extracted query descriptor $F^j_q$ at a location vector (i.e. estimated distance and estimated direction from the center point) of the associated reference object, mathematically represented herein as $z(F^j_q)$, is matched to a training descriptor mathematically represented as $N^j_k$. For every unmatched nearby (e.g., according to a distance requirement, optionally the Euclidean distance requirement) extracted query descriptor, mathematically represented herein as $F^m_q$, a matching training descriptor, mathematically represented herein as $N^m_k$ is computed such that the difference between the center point of the identified matching training descriptor and the computed training descriptor matched to the unmatched query descriptor is equal to the difference between the location vector of the query descriptor matched to the identified matching training descriptor and the location vector of the unmatched query descriptor for which the matching training descriptor is computed, mathematically represented as: $o(N^j_k) - o(N^m_k) = z(F^j_k) - z(F^m_k)$, where:

$N^j_k$ denotes a training descriptor matched to query descriptor $F^j_k$ $N^m_k$ denotes the computed training descriptor matched to unmatched query descriptor $F^j_k$ denotes the query descriptor matched to training descriptor $F^j_k$ $F^m_k$ denotes the unmatched query descriptor for which the matching training descriptor $N^m_k$ is computed Optionally, an unmatched query descriptor $F^m_q$ is paired with a single already matched query descriptor $F^j_q$ that is closest to the unmatched query descriptor $F^m_q$. The distance between the unmatched query descriptor and the paired already matched query descriptor may be determined based on pixel coordinates of the query image (e.g., according to the distance transform). Paired of unmatched query descriptors and already paired query descriptors not meeting the matching requirement discussed above are excluded. The pairing with the single already matched query descriptor reduces computations, improving computational performance of the computing device.

The match extension process is iterated. The process may be randomized by independently ignoring each previously matched query descriptor with a defined probability p, for example, p=0.5 or other values. The randomization provides that for any unmatched query descriptor, the probability of extending the match from the $n^{th}$ closest already matched query descriptor is equal to $(1-p)p^{n-1}$. The matching is extended from multiple nearby query descriptors rather than just from the spatially closest query descriptor.

At 110, object-regions of the digital image are computed, for example, squares, rectangles, circles, a polygon, or other shapes. Object-regions are computed when the digital image includes two or more target objects. The case of a single target object may be processed without necessarily defining the object-region.

Each object-region approximately bounds one target object. Each object-region is associated with a cluster of query descriptors. The members of each cluster of query descriptors are located within the object-region, and/or in near proximity to the object-region (e.g., to account for the approximation of the object-region bounding the target object) and/or the center points of the relative location data of the training descriptors matching the members of the cluster of query descriptors are located within the object-region and/r are located in proximity to the center point of the object-region. Each object-region is associated with a center point.

Optionally, a center point of the object-region is computed without necessarily computing the size and/or borders of object-region itself. The members of the cluster of query descriptors are selected relative to the center point of the object-region. The center point of the object-region is estimated to correspond to the center point of one of the reference object categories.

Optionally, the object-regions are computed based on a computed aggregated relative location data for each query descriptor based on the relative location data associated with the matching training descriptor. The computed aggregated relative location data for each query descriptor represents an averaged contribution of each of the identified nearest neighbor training descriptors (e.g., the K nearest neighbors).

Each object-region may be computed based on the following exemplary method: The relative location data of the matching training descriptors is aggregated to generate a Kernel Density Estimate (KDE) for posterior probability maps of the center point and scale of each respective reference object. The posterior probability maps are aggregated into probability map clusters. Each probability map cluster may be represented as an x-y-s-3D-heatmap having a center point at a location with coordinates defined by an x-axis (x) and a y-axis(y) and defined by a scale (s). Each of the object-regions is extracted according to the probably map clusters, based on inter-scale normalization and non-maximal suppression according to location of the center point and the scale of each respective probability map cluster. Each object-region is defined according to the center point and scale of the reference object associated with the respective probability map cluster.

The systems and/or methods described herein compute the object-regions independently of the category of the reference object associated with each of the object-regions.

In terms of mathematical representation, U denotes a triplet of random variables U=<X, S, C> representing a random event of appearance of a target object from reference object category C at image location X (object center coordinate) and scale S (scale relative to the nominal size of the object, X and S may jointly define a bounding box (corresponding to the object-region). It is noted that S is optional, such as when training descriptors are extracted from different levels of a Gaussian pyramid of the training image. The image location may be defined according to the relative location data that includes an estimated distance and an estimated direction from the center point.

The posterior probability $P(U|F_q^j)$ is computed and/or approximated for all the possible assignments to U, where $F_q^j$ denotes a certain extracted query descriptor. The top scoring hypotheses U are selected used the computed probabilities, for example, by a Non-Maximal Suppression (NMS) process based on overlaps between the object-regions. Based on an assumption of a uniform prior over U, and that the posterior probability decomposes using the Native-Bayes method, the following mathematical relations may be used:

$$P(U | \{F_q^j\}) \propto P(\{F_q^j\} | U) = \prod_j P(F_q^j | U)$$

It is assumed that each target object occupies a small portion of the query image, and therefore that most of the query descriptors $\{F_q^j\}$ are not generated by a certain assignment to U that represents a hypothesis that a certain target object is present at a certain image object-region. Such query descriptors are either associated with the background of the image or with other target objects of the image. In terms of mathematical representation:

$P(F_q^j|U)=\Sigma_{R^j} P(R^j) \cdot P(F_q^j|U,R^j)$ where $R^j$ denotes an unobserved binary random variable, $R^j=1$ denotes the event that $F_q^j$ is indeed related to the hypothesis U.

The distributions $Q(F_q^j)$, $Q(F_q^j,X,S)$, and $Q(F_q^j,X,S,C)$ are computed for every query descriptor $F_q^j$ extracted from query image $I_q$, and are defined below with reference to Equations (4)-(6). $P(F_q^j|U,R^j)$ when $R^j=1$ and $P(F_q^j|U,R^j)=Q(F_q^j)$ when $R^j=0$, which provides: $P(R^j=0) \gg P(R^j=1)$, and the following relationship holds:

$$\mathrm{Log}P(U | \{F_q^j\}) = \mathrm{const} + \sum_j \mathrm{Log}P(F_q^j | U) \approx \sum_j \frac{Q(F_q^j | U)}{Q(F_q^j)} \propto \sum_j \frac{Q(F_q^j, U)}{Q(F_q^j)}.$$

At 112, for each object-region (when object-regions are identified), a group of reference object classifications is selected as candidates for the classification of the target object within the respective object-region.

Query descriptors having common center points defined by the matching training descriptors are clustered. The members of each cluster point towards a common center. The clustering may be performed for each object-region. For example, one cluster of training descriptors is associated with the reference object identifier milk carton, based on a common center corresponding to the center of the milk carton reference object. Another cluster of images descriptors is associated with the reference object identifier tooth paste tube, based on another common center corresponding to the center of the tooth paste tube reference object.

The members of the group may be selected according to an analysis of the relative location data associated with each member of the cluster of query descriptors of each object-region. The analysis identifies a group of common center points of the relative location data. Each member of the group of identified common center points is associated with a respective member of the group of reference object categories.

The members of the group may be selected according to reference object categories associated with the matching training descriptors of the cluster of query descriptors that have the largest number of vectors pointing to a common location, optionally pointing to the center of the object-region (within an error threshold). For example, when 5 query descriptors of the object-region associated with milk have vectors (based on the relative location data and reference object category of the matching training descriptors) point to the center of the object-region, and 2 query descriptors associated with bread have vectors pointing to different locations in the object-region (or to the center of the object-region), the reference object category milk is selected over bread, as the probability of the target object being milk is higher than the probability of the target object being bread. When selecting milk over bread, the matching training descriptors that point to the common query image location within the error threshold (i.e., share the common object hypothesis) are considered. Training descriptors that point to other image locations are excluded under the assumption as association with a different object hypothesis.

The members of the group may be selected according to a requirement of a computed probability of the target object within the object-region being each of the reference object categories associated with the matching training descriptors of the cluster of query descriptors associated with the object-region. For example, the top 3 or 5 candidate reference object categories.

The computed probability of the target object bounded by the respective object-region being each one of the reference object categories associated with each identified matching training descriptor(s) of each member of the cluster of query descriptors associated with the respective object-region is computed. The probability is computed based on the probability of observing each member of the cluster of query descriptors associated with each respective reference object category of the matching descriptor(s) located relative to the center point of the respective object-region according to the relative location data defined by the matching training descriptor.

As mathematically represented below with equations, the probability of the respective target object being one of the reference categories is computed based on one or more of the following components: a data fidelity value that penalizes distance between the query descriptor and the matching training descriptor(s), a penalty for deviation in expected spatial location between the center of the hypothesis-region of the target object and the center of the reference object associated with the matching training descriptor(s), and discrepancy in scale between the target object and the reference object associated with the matching training descriptor(s).

To identify the most likely hypothesis U by computing $\operatorname{argmax}_U \log P(U|F^j_q)$ arg $\max_U \log(U|F^j_q)$, the following exemplary method is described for handling the large size of the proposal set for U=<X, S, C>, based on the assumption of a large number of reference object categories. The exemplary method is based on a sequential approximate inference, where each time a part of the variables is inferred and conditions the inferred variables to infer the remaining variables. The following three steps of the inference method are mathematically represented as:

inference step (1)

$$\hat{X}, \hat{S} \leftarrow \operatorname{argmax}_{X,S} \sum_j \frac{Q(F^j_q, X, S)}{Q(F^j_q)}$$

$$\left(\text{here } Q(F^j_q, X, S) = \sum_C Q(F^j_q, X, S, C)\right),$$

inference step (2)

$$\hat{C} \leftarrow \operatorname{argmax}_C P(C \mid \{F^j_q\}, \hat{X}, \hat{S}) = \operatorname{argmax}_C \sum_j \frac{Q(F^j_q, \hat{X}, \hat{S}, C)}{Q(F^j_q)},$$

inference step (3)

$$\hat{X}, \hat{S} \leftarrow \operatorname{argmax}_{X,S} P(X, S \mid \{F^j_q\}, \hat{C}) = \operatorname{argmax}_{X,S} \sum_j \frac{Q(F^j_q, X, S, \hat{C})}{Q(F^j_q)}.$$

The distributions $Q(F^j_q)$, $Q(F^j_q,X,S)$, and $Q(F^j_q,X,S,C)$ are computed for every query descriptor $F^j_q$ extracted from query image $I_q$, and used as input for the relevant inference steps (1-3).

Each of the inference steps (1-3) returns multiple hypotheses to be processed by the subsequent step, where the final output of step (1) is the input to the NMS process. The equation of step (1) denotes an objectness step that infers the potential locations (e.g., relative location data) and optional scales of the target objects (optionally all the target objects) present in the query image $I_q$ regardless of their category. As discussed with reference to block 114 of FIG. 1, the equation of step (2) denotes generation of the short list of potential candidate reference object categories for each object-region returned by the objectness step (1). The equation of step (3) denotes a detection refinement step, in which the location and optionally the scale is refined for each candidate reference object returned by step (2), and the final score is computed for the candidate reference object.

As described with reference to act 108 of FIG. 1, a set of K nearest neighbors of $F^j_q$ in the set of training descriptors are identified. The set of K nearest neighbors are optionally the Euclidean nearest neighbors, mathematically represented as $\{N^j_k | 1 \leq k \leq K\}$. The set of training descriptors extracted from the training images is mathematically represented as $\{F^i_t | \forall i, t\}$. From the set of nearest neighbors, $Q(F^j_q,X,S)$ is computed, using approximate Kernel Density Estimate, mathematically represented as:

$$Q(F^j_q, X, S) \approx Q(S) \cdot \frac{1}{K} \sum_{k=1}^{K} \phi(F^j_q, N^j_k, X, S), \quad \text{equation (4)}$$

where $$\phi(F^j_q, N^j_k, X, S) = \exp\left(-\frac{1}{2}\|F^j_q - N^j_k\|^2/\sigma^2\right) \cdot \ldots \cdot \quad \text{equation (5)}$$

$$\exp\left(-\frac{1}{2}S^2\|X - |z(F^j_q) + o(N^j_k)|\|^2/\rho^2\right) \cdot \ldots \cdot$$

$$\exp\left(-\frac{1}{2}(S - s(N^j_k))^2/\gamma^2\right)$$

The value for $Q(F^j_q,X,S)$ is an averaged contribution of the K nearest neighbors. The probability of observing query descriptor $F^j_q$ at location X, optionally with scale S, conditioned on the certain neighbor training descriptor $N^j_k$ may be modeled as a product of three components in the equation above.

The first component $$\exp\left(-\frac{1}{2}\|F^j_q - N^j_k\|^2/\sigma^2\right)$$

denotes the data fidelity term, penalizing distance between the visual descriptor $F^j_q$ and the certain neighbor training descriptor $N^j_k$. $\sigma$ denotes a defined tolerance to variation of the expected query descriptor appearance.

The second component $$\exp\left(-\frac{1}{2}S^2\|X - |z(F^j_q) + o(N^j_k)|\|^2/\rho^2\right)$$

denotes the penalty for deviation in expected spatial location, where $z(F^j_q)$ denotes the image location of $F^j_q$ in query image $I_q$ and $o(N^j_k)$ denotes the vector between training descriptor $N^j_k$ and the center of the reference object. $\rho$ denotes a defined tolerance to the expected local object deformation.

The third component $$\exp\left(-\frac{1}{2}(S - s(N^j_k))^2/\gamma^2\right)$$

denotes the discrepancy in scale. $\gamma$ denotes a defined tolerance to local scale variation.

Exemplary tolerance values (used in the experiments described below) include: $\sigma$=0.2, $\rho$=15, and $\gamma$=0.1. The tolerance values were set on a small validation set not used in the experiments.

The term $\phi(F^j_q, N^j_k, X, S)$ denotes the belief (e.g., probability) that a certain query descriptor $F^j_q$ extracted from a certain target object (from any reference object) appears at location X, optionally with scale S, based on the matching training descriptor $N^j_k$.

To balance the different object scales being represented by a different number of training descriptors, set $$Q(\tilde{S}) \propto \frac{1}{S^2}.$$

Marginalizing over X and S leaves the fidelity term alone:

$$Q(F_q^j) \approx \frac{1}{K}\sum_{k=1}^{K} \exp\left(-\frac{1}{2}\|F_q^j - N_k^j\|^2/\sigma^2\right) \quad \text{equation (6)}$$

To improve the computation efficiency of computing the equation of inference step (1) efficiency with $Q(F_q^j,X,S)$ as defined by equation (4) for each scale S, a weighted histogram of the size of the query image $I_q$, where each pixel $z(F_q^j)+o(N_k^j)$ accumulates weight mathematically represented as $$\frac{\exp\left(-\frac{1}{2}\|F_q^j - N_k^j\|^2/\sigma^2\right)}{S^2 Q(F_q^j)},$$

and then a convolution is performed with a 2D symmetric Gaussian kernel with STD ρ/S. The average across nearby scales using a 1D Gaussian kernel with STD γ is computed. The following mathematical relationship is set:
$Q(F_q^j,X,S,C) \propto \Sigma_k \text{id}(l(N_k^j)=c) \cdot \phi(F_q^j,N_k^j,X,S)$ where id( ) denotes the indicator function.

The equation in inference step (2) may be computed by maximizing over a weighted histogram accumulating to cells indexed by $l(N_k^j)$ with weights denoted by $\Phi(F_q^j,N_k^j,X,S)Q(F_q^j)$.

The equation in inference step (3) is computed as the equation in inference step (1), with filtering out of the weights for which $l(N_k^j) \neq C$.

Optionally, at 114, the accuracy of classifying the target reference object is improved with CNN 206B, which may be stored in locally in data storage device 206, data repository 216, and/or remotely in server 220 and/or other external computing devices. The CNN computes a more accurate classification of each of the target objects in the image. The CNN receives as input each portion of the digital image corresponding to the respective defined object-regions and each member of the associated subgroup of reference objects. The CNN is trained on an expanded training set of training images created by random geometric and photometric transformations of each training image sample, for example, from the single training image samples.

Alternatively, the CNN is not used. The reference object category to designate to the target object of each object-region is based on the highest computed probability and/or computed score of the group of reference object categories. The target object (of each object-region) may be classified according to the reference object identifier of the cluster, according to a statistically significant correlation requirement between the common center point of the respective cluster and the center point of the reference object associated with the reference object identifier. The cluster of training descriptors that have associated reference object identifier and associated relative location data, for which the common center point associated with the training descriptors of the cluster is closest to the center point of the reference object associated with the reference object identifier of the members of the cluster is selected. For example, the target object is classified as a milk carton when the training descriptors associated with the milk carton identifier are associated with a common center point that is statistically significantly correlated with the center point of the milk carton image.

Optionally, for each of the identified target objects, the scores computed for the top predefined number of (e.g., the top 3, 5, 7, or other values) members of the associated subgroup of reference objects are adjusted by multiplying each respective scores by the corresponding confidence value computed by the CNN for each of the reference object identifiers. The identified target object may be adjusted (or confirmed) based on the reference object associated with the highest value of the adjusted scores of the top predefined number of members of the associated subgroup of reference objects. It is noted that full training of the CNN based on standard methods is not performed due to the limited number of training images per object category, optionally a single image per object category.

An exemplary CNN is now described. The exemplary CNN uses the first 2-15 layers of the VGG-f network (e.g., as described with reference to Chatfield et al.) trained on ImageNet (e.g., as described with reference to J. Deng, W. Dong, R. Socher, L.-J. Li, K. Li, and L. Fei-Fei. *ImageNet: A Large-Scale Hierarchical Image Database.* In CVPR09, 2009), and adapts other layers. The stride of the first cony layer is reduced from 4 to 2 to increase the spatial sampling rate of the input images, which decreases the minimal image size admissible by the network. One additional set of layers (cony, ReLU, maxpooling, and LRN) is added after the 15th pool5 layer. The size of the cony filters is set at 3×3 (or other suitable values), and max-pool is set to the same or similar values as in other layers of the corresponding type in the VGG-f network. The size of the fc6 and fc7 fully-connected layers of the VGG-f are modified from 4096 to 2048 (or other suitable value). For a canonical image size (which is set to 325 or another suitable value by appropriate selection of the spatial dimensions of the additional filter), the output of fc7 is 1×1×2048, which is concatenated with a vector of 1×1×Ncats per target object category confidence values computed for each object-region, wherein Ncats denotes the number of target object categories, before feeding the output to fc8.

The CNN is trained with random geometric and/or photometric transformations of each training image of each reference object category. For example, 100000 (or other number of) training examples are generated from a single (e.g., studio) image per reference object category. An exemplary synthesis process for creating the expanded set of training images from the original set of training images is now described. The method is based on the observation that learning the parameters for photometric transformations requires a few dozen annotated objects in real world images. An array of training object examples is generated over a random natural image background. The generated image is processed by undergoing a random homography followed by a random photometric transformation. The homography is generated by computing five (or other suitable value of) random values for the yaw, pitch and roll angles, translation and scale. The random values extend the mirror reflections and translations commonly used for geometric augmentation, for example, as described with reference to Krizhevsky et al.

Optionally, an auxiliary dataset of annotated reference objects in the same domain as the reference objects in the training images (e.g., retail products) is used, for example, 80 (or other value) of in-situ reference objects (i.e., the crops) each paired with respective studio catalog images (i.e., templates). Each such crop-template pair is registered by a homography. For each pair a local linear filter is computed, that when applied to the template, produces an image as close as possible to the corresponding crop, in the least squares sense. The IRLS algorithm (e.g., as described with reference to P. W. Holland and R. E. Welsch. *Robust regression using iteratively reweighted least-squares. Communications in Statistics-Theory and Methods*, 6(9):813-827, 1977) may be used to compute the filters. The learned filter represents the combined effect of the PSF of the camera, illumination, and contrast loss, observed in the crop. Exemplary filters are of size m×m where m is selected from the set 3, 5, 7, 9, or other values, from each crop-template pair, producing a set of 320 photometric filters. Photometric distortions are generated as random convex combinations of three randomly chosen filters from the collection.

It is noted that training data synthesis alone is not a suitable method for training using existing methods, as described in the results section of the experiment (below) by the lower performance of the FRCNN detector (described with reference to Ren et al.) relative to the CNN described herein, where the FRCNN is trained on the same synthetic data we used to evaluate the CNN.

At 116, temporal integration of per-frame detection and recognition of target objects is applied to images (e.g., frames) of a video. The temporal integration provides improved computational performance.

Inventors verified the computational performance boost of the temporal integration of images of the video, by using the KLT tracker described with reference to J. Shi and C. Tomasi. *Good features to track.* 1993 (implemented in OpenCV described with reference to G. Bradski. citeulike=2236121. *Dr. Dobb's Journal of Software Tools*) to compute homographies between consecutive video frames, and track each object-regions to subsequent frames until each respective object-region becomes covered (IoU≥0.5) by other object-regions or exits the frame. To limit the effect of FAs, a score decay factor of 0.8 was used for all the tracked object-regions that remain uncovered.

At 118, the classification of each target object (optionally identified within each object-region) is provided. Optionally, the image is adapted to present the classification of the identified target objects, for example, using a tag, color code, or other method. Optionally, the image is adapted to present each object-region, for example, the object-regions are marked on the image. Alternatively or additionally, metadata and/or another report format is generated indicative of the identified categories, for example, 55 milk cartons, 10 boxes of cereal, and 43 bottles of coke. In another example, the coordinates (i.e., the center) of each target object is provided in association with the designated category.

Figure 3:
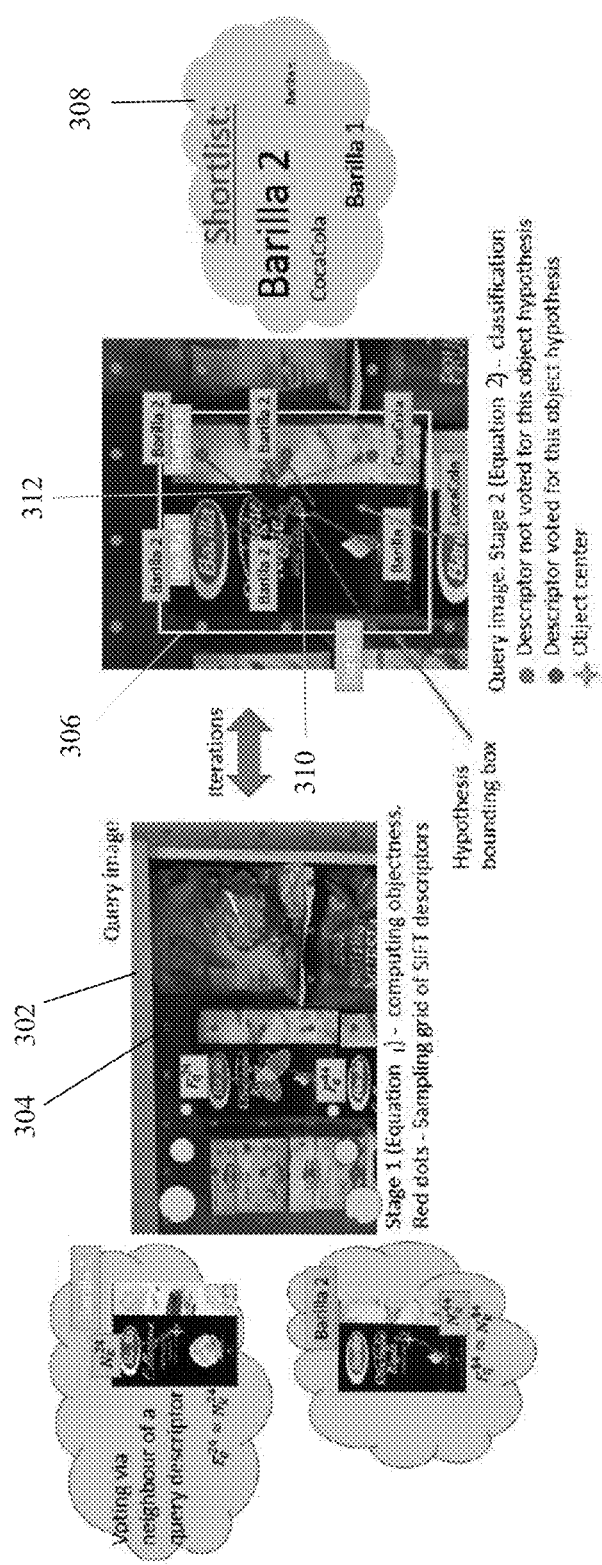
FIG. 3 is a schematic graphically depicting the process of classifying a target object in an image based on the method described with reference to FIG. 1, and/or the system described with reference to FIG. 2.

Reference is now made to FIG. 3, which is a schematic graphically depicting the process of assigning a category to a target object in an image based on the method described with reference to FIG. 1, and/or the system described with reference to FIG. 2, in accordance with some embodiments of the present invention.

A query image 302 is received, as described herein. Query descriptors (represented as dots, one dot 304 is marked for clarity) are extracted from query image 302. Each query descriptor is matched to a respective training descriptor. For example, query descriptor $F^{24}_q$ is matched to training descriptor $N^{24}_k$, and query descriptor $F^{44}_q$ is matched to training descriptor $N^{44}_k$. Each training descriptor is associated with a reference object and relative location data (estimated distance and estimated direction from a center point of the reference object). For example, $N^{24}_k$ is associated with the reference object category Barilla 1, and $N^{44}_k$ is associated with the reference object category Barilla 2.

An object-region (termed hypothesis bounding box in the FIG. 306 is defined on query image 302, as described herein. Certain query descriptors are excluded, such as query descriptors having vectors (of the matching training descriptors) pointing outside object-region, and/or query descriptors located outside of object-region 306. Certain query descriptors located outside object-region 306 are included, such as query descriptors having vectors pointing inside object-region 306.

A sub-group of candidate reference object categories (i.e., shortlist 308) for the target object located within object-region 306 is selected, as described herein. Each candidate is associated with a probability and/or other score (represented in FIG. 3 according to size of the letters of the category in shortlist 308). For example the sub-group includes Barilla 2, CocaCola, Barilla 1, and Barilla 5.

The probability of each candidate reference object category is computed based on the number of vectors of the query descriptors pointing to a common location, optionally to a center point 310 of target region 306. As shown, the large number of vectors pointing to center point 310 are associated with the category Barilla 2. For clarify of explanation, 312 points to one vector. A smaller number of vectors pointing to different locations within target region 306 are associated with the category CocaCola.

The category Barilla2 is associated with the highest probability and/or score, and is selected from shortlist 308 to assign to the target object within target region 306.

Figure 4:
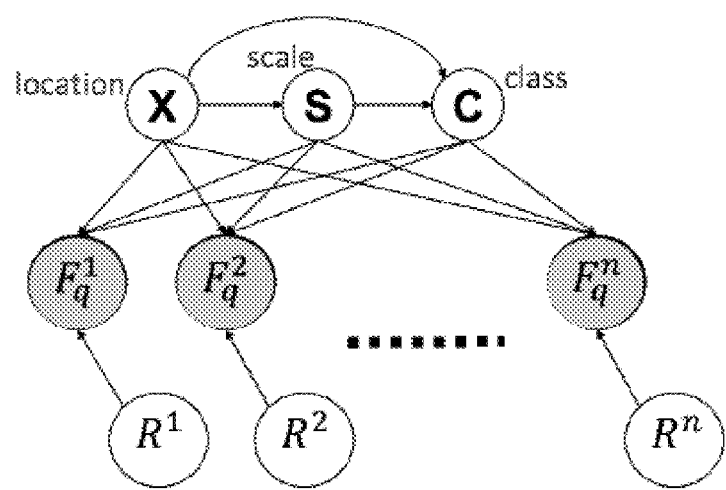
FIG. 4 is a is a schematic of a probabilistic model used to identify a category of a reference object to assign to a target object, in accordance with some embodiments of the present invention.

Reference is now made to FIG. 4, which is a schematic of a probabilistic model used to identify a category of a reference object to assign to a target object, in accordance with some embodiments of the present invention. $R^1, R^2, R^n$ denote binary random variables used to randomly disconnect descriptions from the hypothesis U. One binary random variable is associated with each query descriptor $F^1_q$, $F^2_q$, $F^n_q$. $R^i=0$ denotes $F^i_q$ is generated independently from the hypothesis U. As discussed herein, Each query descriptor $F^i_q$ is associated with a hypothesis U that includes a location X (i.e., relative location data relative to a center point of a certain reference object category), a scale S, and a class C (i.e., reference object category), which are associated with the one or more training descriptors matched to each query descriptor.

Figure 5:
FIG. 5 includes images processed to classify target object shown in each image, in accordance with some embodiments of the present invention.

Reference is now made to FIG. 5, which includes images processed to identify categories of each target object shown in each image, in accordance with some embodiments of the present invention. The images represent different types of products, which were evaluated as described in the examples section below. Each image is adapted to include a visual box indicative of the identified object-region, and a visual tag indicative of the reference object category identified for the target object within each object-region.

Various embodiments and aspects of the systems and/or methods described herein and as claimed in the claims section below find experimental support in the following examples.

EXAMPLES

Reference is now made to the following examples, which together with the above descriptions illustrate some implementations of the systems described herein, in a not necessarily limiting fashion.

Six different datasets were used to evaluate computations performance of a computing device executing code instructions according to the systems and/or methods described herein. Three of the datasets were collected by the inventors: PCPE—Point Clouds Pose Estimation dataset, video games dataset (3.7K categories), and retail products dataset (121 categories). Two additional existing retail benchmarks were used, Grozi-120 (described with reference to Merler et al.) and Grozi-3.2K (described with reference to George et al.) (referred to as Grocery Products in the original publication), containing 120 and 3.2K retail product categories respectively. Another benchmark used is the FlickrLogos-32 dataset of logos in the wild, described with reference to S. Romberg, L. G. Pueyo, R. Lienhart, and R. van Zwol. *Scalable logo recognition in real-world images. In Proceedings of the 1st ACM International Conference on Multimedia Retrieval, ICMR '11*, pages 25:1-25:8, New York, N.Y., USA, 2011. ACM. The retail and logo datasets were captured in-situ with very limited training (primarily one studio image per retail product, 40 images per logo). The experiments demonstrate high quality computational performance on the datasets collected by the inventors, as well as improvement in terms of computational performance with reference to the state-of-the-art aforementioned benchmarks. In addition, to demonstrate the inherent difficulty of the very limited training setup described herein (i.e., limited number of images per reference object category, optionally one image per category) to the top-performing existing deep methods, for example, based on the R-CNN methodology, the public implementation of the seminal Faster RCNN (FRCNN) method (which exhibits strong results on PASCAL and other datasets) as described with reference to Ren et al. is applied it to some of the inventor generated datasets. Using just a single example per class, a FRCNN is trained using the same simulated training data used to train the CNN described herein.

Table 1 below summarizes the results of the quantitative performance of the method described herein. The results are compared to other existing methods, including FRCNN as described with reference to Ren et al. and state-of-the-art methods as described with reference to George et al. and F. N. Iandola, A. Shen, P. Gao, and K. Keutzer. *Deeplogo: Hitting logo recognition with the deep neural network hammer. CoRR, abs/1510.02131*, 2015. Results described with reference to George et al. and Iandola et al. are obtained from the respective papers. All the numbers are mean Average Precision (mAP). Due to poor image quality or the too large number of (1–example) diverse categories in the Grozi-120/3.2K datasets respectively, DL based methods (namely FRCNN and the CNN) were not tested (please see text for a reduced experiment of applying FRCNN on Grozi-3.2K). The Grozi-3.2K and FlickrLogos-32 datasets contain only still images. The top-5 mAP is mAP computed where the hypothesis is considered correct if one of its 5 highest-scored classes is correct.

| Dataset | George et al. | Iandola et al. | FRCNN | Method of FIG. 1 without CNN | Method of FIG. 1 using CNN |
| --- | --- | --- | --- | --- | --- |
| Grozi-3.2K | 23.9% | — | — | 42.97% | 44.72% |
| Grozi-120 | — | — | — | 43.33% | — |
| Grozi-120 subset from George et al. | 13.21% | — | — | 54.22% | — |
| GameStop | — | — | 27.17% | 81.3% | 87.5% |
| Retail 121 | — | — | 53.67% | 84.6% | 84.7% |
| Flickr32 | — | 74.4% | — | 78.5% | 79.3% |

An un-optimized Matlab implementation of the systems and/or methods described herein executes in less than 1 second for a 1 mega-pixel image on a regular PC.

The Grozi-3.2K dataset includes 680 test images collected from 5 stores. Each image includes multiple instances of products out of a total of 3235 food product categories, which are also organized in 27 larger classes, such as: bakery, candy, cereal, and the like. The training data includes 1 studio image per product. Many of the products appear deformed on the shelves (e.g., rotated, piled, and the like) and with similar but different packaging. Images 502 of FIG. 5 depict results of processing image of the Grozi-3.2K dataset. For comparison with the systems and/or methods described herein, the experiments were performed on the Grozi-3.2K dataset using the protocol described with reference to George et al. For each category out of total 3235 only one studio example was available. Consequently, in order to test FRCNN on the Grozi-3.2K dataset, the recognition task was reduced to identify the 27 larger classes the products were mapped to, with hundreds of examples for each class. For the simplified task, FRCNN produced a mAP of 81.1%, in comparison to the method described herein that produced a mAP of 86:47%.

The Grozi-120 dataset described with reference to Merler et al. includes 29 test videos of 120 products on various shelves in retail stores. The test set has 4973 frames annotated with ground-truth (GT). The training set included approximately 6 studio images per product category. For performance comparison with the systems and/or methods described herein, the protocol described with reference to George et al. was used. Images 504 of FIG. 5 depict results of processing image of the Grozi-120 dataset. Table 1 includes the performance results of the full Grozi-120 set, and performance of the subset of 885 frames used in George et al.

The GameStop dataset was collected by the inventors in GameStop® retail stores (with kind permission of the GameStop®), includes 5 videos in each frame including multiple instances (up to several dozen) of 3.7K video game categories captured in their natural store environment. Inventors manually annotated 1039 frames of the videos with bounding boxes (i.e., object-regions) of all the products in each frame. Images 506 of FIG. 5 depict results of processing image of the GameStop dataset.

The Retail-121 dataset collected by the inventors, includes two videos with multiple instances of 121 fine-grained retail product categories in each frame. The training was based on one image per product category. The main reason we collected this dataset is to showcase our system performance in a more controlled conditions when the training images represent exactly the appearance of products on the shelves (i.e. same product packaging in both training and test). Images 508 of FIG. 5 depict results of processing image of the Retail-121 dataset.

The FlickrLogos-32 dataset includes 32 brand logos, with 40 training images and 30 test images per brand. Images 510 of FIG. 5 depict results of processing image of the FlickrLogos-32 dataset. The training and test sets are as defined by FlickrLogos-32 authors. The CNN described herein was trained using 12 plane rotations of each of the 40 training logo examples per brand (the examples are cropped from training images using provided masks). The mean AP obtained using the CNN described herein is 79.3%, which exceeds by 4.9% the state of-the-art result described with reference to Iandola et al. that is based on deep networks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant images will be developed and the scope of the term image is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computed implemented method of identifying a plurality of target objects in a digital image, the method comprising:

receiving a digital image including a plurality of target objects;

extracting a plurality of query descriptors from respective a plurality of locations in the digital image;

comparing each one of said plurality of query descriptors with a plurality of training descriptors for identifying a plurality of matching training descriptors, each one of the plurality of training descriptors is associated with one of a plurality of reference object identifiers and with relative location data comprising an estimated distance and an estimated direction from a center point of a reference object indicated by the respective associated reference object identifier from the plurality of reference object identifiers;

computing a plurality of object-regions of the digital image by clustering the query descriptors having common center points defined by the matching training descriptors, each object-region approximately bounding one target object of the plurality of target objects of the digital image, each object-region is associated with another common center point of said common center points and with a scale relative to a reference object size, wherein each of the plurality of object-regions is computed independently of the respective reference object identifier associated with said each of the plurality of object-regions and is computed by:

aggregating the relative location data of the matching training descriptors to generate a Kernel Density Estimate (KDE) for a plurality of posterior probability maps of the center point and scale of each respective reference object of the plurality of reference object identifiers;

aggregating the posterior probability maps into a plurality of probability map clusters;

extracting each of the plurality of object-regions with inter-scale normalization and non-maximal suppression according to location of the common center point and the scale of each respective cluster of the plurality of probability map clusters, wherein each of the plurality of object-regions is defined according to the center point and the scale of the reference object of the plurality of reference objects associated with the respective cluster of the plurality of probability map clusters; and classifying the bound target object of each object-region of the plurality of object-regions according to the reference object identifier of a respective cluster according to a statistically significant correlation requirement between a common center point of the respective cluster and the center point of the reference object associated with the reference object identifier of the respective cluster.

2. The method of claim 1, wherein the plurality of probability map clusters are each represented as an x-y-s-3D-heatmap having a center point at a location with coordinates defined by an x axis (x) and a y-axis(y) and defined by a scale (s).

3. The method of claim 1, wherein each one of the plurality of training descriptors is associated with an estimated scale of one level of a plurality of levels of a Gaussian pyramid, and wherein the scale of the object-region is computed based on the estimated scale of the one level of the plurality of levels of the Gaussian pyramid of the identified matching training descriptors, wherein the object-regions are computed by clustering according to the scale defined by the matching training descriptors.

4. The method of claim 1, further comprising:
selecting, for each bound target object of each object-region, a group of candidate reference object identifiers based on a cluster of query descriptors associated with the respective object-region;
computing a probability of each member of the group of candidate reference object identifiers being the respective target object; and
classifying the bound target object of each object-region of the plurality of object-regions according to the member of the group with the highest computed probability.

5. The method of claim 4, wherein the probability of each member of the group of candidate reference object identifiers is computed based on one or more of the following components: a data fidelity value that penalizes distance between the query descriptor and the plurality of matching training descriptors, a penalty for deviation in expected spatial location between the common center point and the center point of the reference object associated with the plurality of matching training descriptors, and discrepancy in scale between the target object and the reference object associated with the plurality of matching training descriptors.

6. The method of claim 1, wherein the plurality of training descriptors are extracted from a training set comprising a single training sample image of each of the plurality of reference objects associated with each of the plurality of reference object identifiers.

7. The method of claim 6, wherein the plurality of image descriptions are extracted from each single training sample image of each of the plurality of reference objects in a sampling pattern that is denser relative to the pattern of the plurality of locations in the digital image.

8. The method of claim 1, wherein the plurality of training descriptors are indexed with a sub-linear search data structure, and the comparing is performed by searching for the matching training descriptor of the extracted query descriptors within the sub-linear search data structure.

9. The method of claim 1, wherein the extracted query descriptors and each of the plurality of training descriptors is based on scale invariant feature transform (SIFT).

10. The method of claim 1, wherein the comparing is performed by finding a set of Euclidean nearest neighbors of the respective extracted query descriptors, wherein each member of the set of Euclidean nearest neighbors is one of the plurality of matching training descriptors.

11. The method of claim 10, wherein the set of Euclidean nearest neighbors are identified for a first subset of the extracted query descriptors, wherein a second subset of extracted query descriptors are unmatched, wherein for each member of the second subset of extracted query descriptors that are unmatched, a matching training descriptor is computed such that the difference between the center point of the relative location data of the identified matching training descriptors and the center point of the relative location data of the computed training descriptor matched to the unmatched second subset of query descriptors is equal to the difference between the location relative location of the query descriptor matched to the identified matching training descriptor and the location relative location of the unmatched second subset of query descriptors for which the matching training descriptor is computed.

12. The method of claim 11, wherein each member of the second subset of extracted query descriptors that are unmatched is paired to a closest single already matched query descriptor of the first subset of extracted query descriptors according to a distance requirement.

13. The method of claim 11, further comprising iterating the computing of the matching training descriptor for each unmatched query descriptor of the second subset of query descriptors, wherein the probability of extending the matching training descriptor from nth closest members of the first subset of query descriptors is mathematically represented as $(1-p)p^{n-1}$, where p denotes the probability of independently ignoring each previously matched query descriptor.

14. The method of claim 1, further comprising:
providing, to a deep Convolutional Neural Network (CNN), a plurality of clusters of reference object identifiers and respective computed probabilities of each respective target object associated with each cluster of reference object identifiers;
computing, by the CNN, a confidence value for each reference object identifier in the plurality of clusters of reference object identifiers;
adjusting each computed probability, by multiplying each respective probability by the corresponding confidence value computed by the CNN; and
classifying the bound target object according to the adjusted computed probabilities of the respective target object associated with each cluster of the plurality of clusters of reference object identifiers.

15. The method of claim 14, wherein the CNN is trained with an expanded training set of training images created by random combinations of learned geometric and photometric transformations of a single training image sample for each reference object of the plurality of reference objects associated with the plurality of reference object identifiers.

16. The method of claim 1, wherein the digital image is one of a plurality of frames in a video, and further comprising performing temporal integration of each respective computed object-region and each designated target object for each digital image of the plurality of frames.

17. A system for identifying a target object in a digital image, the system comprising:
  a non-transitory memory having stored thereon a code for execution by at least one hardware processor of a computing device, the code comprising:
    code for extracting a plurality of query descriptors from respective a plurality of locations in the digital image;
    code for comparing each one of said plurality of query descriptors with a plurality of training descriptors for identifying a plurality of matching training descriptors, each one of the plurality of training descriptors is associated with one of a plurality of reference object identifiers and with relative location data comprising an estimated distance and an estimated direction from a center point of a reference object indicated by the respective associated reference object identifier from the plurality of reference object identifiers;
    code for computing a plurality of object-regions of the digital image by clustering the query descriptors having common center points defined by the matching training descriptors, each object-region approximately bounding one target object of the plurality of target objects of the digital image, each object-region is associated with another common center point of said common center points and with a scale relative to a reference object size,
    wherein each of the plurality of object-regions is computed independently of the respective reference object identifier associated with said each of the plurality of object-regions and is computed by:
      aggregating the relative location data of the matching training descriptors to generate a Kernel Density Estimate (KDE) for a plurality of posterior probability maps of the center point and scale of each respective reference object of the plurality of reference object identifiers;
      aggregating the posterior probability maps into a plurality of probability map clusters;
      extracting each of the plurality of object-regions with inter-scale normalization and non-maximal suppression according to location of the common center point and the scale of each respective cluster of the plurality of probability map clusters, wherein each of the plurality of object-regions is defined according to the center point and the scale of the reference object of the plurality of reference objects associated with the respective cluster of the plurality of probability map clusters,
    and
    code for classifying the bound target object of each object-region of the plurality of object-regions according to the reference object identifier of a respective cluster according to a statistically significant correlation requirement between the common center point of the respective cluster and the center point of the reference object associated with the reference object identifier of the respective cluster.

18. A computer program product for identifying a target object in a digital image, the computer program product comprising:
  a non-transitory memory having stored thereon a code for execution by at least one hardware processor of a computing device, the code comprising:
    instructions for extracting a plurality of query descriptors from respective a plurality of locations in the digital image;
    instructions for comparing each one of said plurality of query descriptors with a plurality of training descriptors for identifying a plurality of matching training descriptors, each one of the plurality of training descriptors is associated with one of a plurality of reference object identifiers and with relative location data comprising an estimated distance and an estimated direction from a center point of a reference object indicated by the respective associated reference object identifier from the plurality of reference object identifiers;
    instructions for computing a plurality of object-regions of the digital image by clustering the query descriptors having common center points defined by the matching training descriptors, each object-region approximately bounding one target object of the plurality of target objects of the digital image, each object-region is associated with another common center point of said common center points and with a scale relative to a reference object size,
    wherein each of the plurality of object-regions is computed independently of the respective reference object identifier associated with each of the plurality of object-regions and is computed by:
      aggregating the relative location data of the matching training descriptors to generate a Kernel Density Estimate (KDE) for a plurality of posterior probability maps of the center point and scale of each respective reference object of the plurality of reference object identifiers;
      aggregating the posterior probability maps into a plurality of probability map clusters;
      extracting each of the plurality of object-regions with inter-scale normalization and non-maximal suppression according to location of the common center point and the scale of each respective cluster of the plurality of probability map clusters, wherein each of the plurality of object-regions is defined according to the center point and the scale of the reference object of the plurality of reference objects associated with the respective cluster of the plurality of probability map clusters,
    and
    instructions for classifying the bound target object of each object-region of the plurality of object-regions according to the reference object identifier of the respective cluster according to a statistically significant correlation requirement between the common center point of a respective cluster and the center point of the reference object associated with the reference object identifier of the respective cluster.

* * * * *